United States Patent Office 3,503,926
Patented Mar. 31, 1970

3,503,926
SOLID LUBRICANT COMPOSITION
John C. Saylor, Midland, Mich., assignor to Dow Corning Corporation, Midland, Mich., a corporation of Michigan
No Drawing. Filed May 17, 1968, Ser. No. 729,887
Int. Cl. C08g *31/20;* C10m *7/48*
U.S. Cl. 260—46.5        3 Claims

ABSTRACT OF THE DISCLOSURE

Organosiloxane copolymers of perfluoroalkylsiloxane units and diphenylsiloxane units are disclosed. An illustrative example is a copolymer of 50 mol percent diphenylsiloxane units and 50 mol percent 3,3,3-trifluoropropylmethylsiloxane units which has utility as a solid lubricant.

---

This invention relates to organisiloxane copolymers containing fluoroalkylsiloxane units and diphenylsiloxane units.

Fluoroalkyl-substituted siloxane fluids, such as trifluoropropylmethylsiloxane are excellent lubricants. Copolymerization of the fluoroalkylsiloxanes with methylsiloxanes gives an organopolysiloxane lubricant which remains fluid at temperatures below $-65°$ F. Other copolymers of perfluoroalkyl-substituted siloxanes and up to 10 mol percent non-fluorinated siloxane units provide a swell-resistant elastomeric gum as disclosed in U.S. Patent 3,179,619. Elastomeric copolymers containing perfluoroalkyl-substituted siloxane units are also disclosed in British Patent 802,359.

Applicant has found that copolymers of certain fluoroalkylsiloxane and diphenylsiloxane units in certain proportions ars solids. These solid copolymers are excellent lubricants and can be molded into various articles or utilized as coating compositions.

Accordingly, it is an object of the invention to provide a useful solid copolymer.

This and other objects of the invention will be apparent to one skilled in the art upon consideration of the following specification and appended claims.

According to the invention there is provided a solid organopolysiloxane copolymer consisting essentially of (1) from 10 to 70 mol percent of siloxane units of the formula

where:
R is a perfluoroalkyl radical of from 1 to 10 carbon atoms and
R' is a monovalent hydrocarbon radical, and
(2) from 30 to 90 mol percent of diphenylsiloxane units.

For purposes of the invention the R group can be any perfluoroalkyl radical containing up to including 10 carbon atoms, such as perfluoromethyl, perfluoroethyl, perfluorobutyl, perfluoropentyl, perfluorooctyl and the like. These radicals can be either straight or branched chain.

R' can be any monovalent hydrocarbon such as alkyl radicals, for example, methyl, propyl or butyl; alkenyl radicals, for example, vinyl, allyl and hexenyl; cycloaliphatic radicals, for example, cyclohexyl, cyclopentyl and cyclohexenyl; aralkyl hydrocarbon radicals, for example, benzyl; and aryl radicals, for example, phenyl, tolyl and naphthyl. To ensure high temperature stability of the copolymer, it is preferred that the monovalent hydocarbon radical contain 8 carbon atoms or less. Especially preferred is the methyl radical.

The copolymers of the invention can also include small amounts, up to 10 mol percent, of siloxane units containing crosslinking groups, such as, methylvinylsiloxane, diphenylvinylsiloxane, methylphenylvinylsiloxane and the like.

Copolymers of perfluoroalkylsiloxanes and diphenylsiloxane which contain less than 30 mol percent diphenylsiloxane units are not solid, for example, the copolymer of 75 mol percent trifluoropropylmethylsiloxane and 25 mol percent diphenylsiloxane units is a gum. The copolymers of the invention are solids as contrasted to the liquids, gums and elastomers of the prior art.

The above described copolymers can be prepared by the alkaline polymerization of cyclic organosiloxanes of the formula

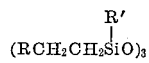

with $(Ph_2SiO)_3$ in the desired proportions or by cohydrolyzing the corresponding chlorosilanes followed by equilibration of the cohydrolyzate with alkali metal hydroxide catalysts or catalysts of the alkali metal salts of silanols. The preparation of cyclic trisiloxanes is well known and described in detail in U.S. Patent 2,979,519 issued to Ogden R. Pierce and George W. Holbrook, which is incorporated herein by reference. The cyclic trisiloxanes are conventionally polymerized by heating in the presence of an alkaline catalyst such as alkali metal hydroxide, quaternary ammonium hydroxide salts and siloxane salts of such hydroxides. Generally, temperatures in the range of 190 to 225° C. are utilized.

In the polymerization of the cyclic trisiloxanes, there may be present such materials as hexaorganodisiloxanes, octa-organotrisiloxanes and deca - organotetrasiloxanes which can supply siloxane endblocking units such as the corresponding triorganosiloxy, pentaorganodisiloxy and heptaorganotrisiloxy radicals. If these groups are not present, the resulting linear copolymers will be hydroxy endblocked.

The following examples are illustrative and should not be construed as limiting the invention which is properly delineated in the appended claims. In the examples, as in the specification, Me designates the methyl radical and Ph designates the phenyl radical.

EXAMPLE 1

A hydroxy endblocked copolymer of 50.5 mol percent $Ph_2SiO$ units and 49.5 mol percent $CF_3CH_2CH_2(Me)SiO$ units was prepared by mixing $(Ph_2SiO)_3$ and

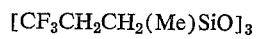

vigorously during the addition of catalyst. During catalyst addition the mixture was maintained at 205° C. $Me_3SiONa$ was used as the catalyst and was added in an amount equal to one sodium atom per 4895 silicon atoms. The mixture was maintained at 205° C. for 11 minutes.

Upon cooling a strong white copolymer was obtained. The copolymer was soluble in hot toluene. Upon evaporation of the toluene solution, a white opaque film of considerable strength was obtained.

EXAMPLE 2

A copolymer of 60 mol percent $Ph_2SiO$ units and 40 mol percent $CF_3CH_2CH_2(Me)SiO$ units was prepared by the method of Example 1. The $Me_3SiONa$ catalyst was added in an amount equal to one sodium atom per 5000 silicon atoms, polymerization temperature was 200° C. After a few minutes the polymerization was complete.

EXAMPLE 3

(1) A hydroxy endblocked copolymer of 39.8 mol percent $Ph_2SiO$ units and 60.2 mol percent CF₃CH₂CH₂(Me)SiO units was prepared by heating and mixing the respective cyclic trimers while adding n-butyl lithium catalyst in hexane. The catalyst was added in an amount sufficient to provide one lithium atom per 2900 silicon atoms. Polymerization was complete after 12 minutes at 225° C.

(2) A copolymer of 49.4 mol percent Ph₂SiO units and 50.6 mol percent and CF₃CH₂CH₂(Me)SiO units was prepared in the same manner as copolymer (1) utilizing the same amount of n-butyllithium catalyst. The polymerization was complete after 12 minutes at 225° C.

(3) A copolymer of 69.7 mol percent Ph₂SiO units and 30.3 mol percent CF₃CH₂CH₂(Me)SiO units was prepared in the same manner as above with the same amount of catalyst. The polymerization was continued for 20 minutes at 210° C.

(4) A copolymer of 54.3 mol percent Ph₂SiO units and 45.7 mol percent CF₃CH₂CH₂(Me)SiO units was prepared as described above by polymerization for 16 minutes at 210° C.

To determine their suitability as solid lubricants, copolymers of the invention were dissolved in hot toluene and coated onto a .751±.0001 inch-diameter, 2 inch long steel plug. Evaporation of the toluene left a coating of copolymer a few microns thick on the plug. The coated plug was then forced into an annular sleeve having internal diameter of .750±.0001. The percent of entry of the plug length into the sleeve at the various loadings was measured. The coefficient of friction was also determined. Of course, the greater the entry and the smaller the load to obtain entry the better the solid lubricant. This test is described in detail in ASTM–TCL–1–2.

For purposes of comparison, graphite, a known solid lubricant, was also tested. Results are set forth below:

| Solid lubricant | Percent entry | Load (lbs.) | Coefficient of friction |
|---|---|---|---|
| Copolymer (1) | 100 | 2,500 | .063 |
| Copolymer (2) | 100 | 5,750 | .128 |
| Copolymer (3) | 100 | 10,750 | .236 |
| Copolymer (4) | 100 | 7,350 | .159 |
| Graphite | 32 | 15,000 | Fail |

These results show the copolymer of the invention to be a superiod solid lubricant.

Included within the scope of the invention is the method of lubrbicating moving metallic parts comprising maintaining therebetween the solid copolymer of the invention. Other reasonable modification and variation are within the scope of the invention which is directed to solid copolymer uses thereof.

That which is claimed is:

1. A solid lubricant consisting essentially of an organosiloxane copolymer consisting essentially of (1) from 10 to 70 mol percent siloxane units of the formula $$RCH_2CH_2\underset{\underset{R'}{|}}{Si}O$$

where:
R is a perfluoroalkyl radical of from 1 to 10 carbon atoms inclusive and
R' is a monovalent hydrocarbon radical, and
(2) from 30 to 90 mol percent diphenylsiloxane units.

2. A method of lubricating moving metallic parts comprising maintaining therebetween a solid copolymer having (1) from 10 to 70 mol percent siloxane units of the formula $$RCH_2CH_2\underset{\underset{R'}{|}}{Si}O$$

where:
R is a perfluoroalkyl radical of from 1 to 10 carbon atoms inclusive and
R' is a monovalent hydrocarbon radical, and
(2) from 30 to 90 mol percent diphenylsiloxane units.

3. The method of claim 2 wherein R is CF₃— and R' is CH₃.

References Cited

UNITED STATES PATENTS

| 3,050,492 | 8/1962 | Polmanteer et al. | 260—37 |
| 3,179,619 | 4/1965 | Brown | 260—37 |
| 3,334,120 | 8/1967 | Holbrook et al. | 260—448.2 |

FOREIGN PATENTS

| 891,199 | 3/1962 | Great Britain. |
| 802,359 | 10/1958 | Great Britain. |

DONALD E. CZAJA, Primary Examiner

M. I. MARQUIS, Assistant Examiner

U.S. Cl. X.R.

117—127; 252—49.6; 260—448.2